Figure 1:
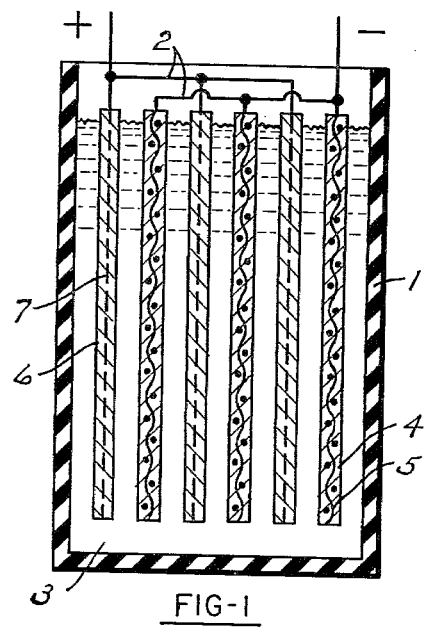

Aug. 24, 1965   W. E. VIELSTICH   3,202,544
ALKALINE ACCUMULATOR
Filed June 2, 1961

INVENTOR.
WOLF E. VIELSTICH

ALKALINE ACCUMULATOR

Wolf E. Vielstich, Bonn, Germany, assignor to The Electric Storage Battery Company, a corporation of New Jersey
Filed June 2, 1961, Ser. No. 114,426
6 Claims. (Cl. 136—6)

The known alkaline accumulators to date are the nickel-iron, nickel-cadmium, silver-cadmium, and silver zinc accumulators. These have in common that a transport of oxygen takes place from one plate to the other, and that the concentration of the electrolyte is in general not changed during charge or discharge. The life and the number of charge and discharge cycles of these accumulators are determined by the stability of the negative electrodes. In particular, electrodes of zinc deteriorate relatively quickly due to the continuous dissolution and redeposition occurring during discharge and charge.

It has been found that the relatively fast deterioration of the negative plates in alkaline accumulators can be avoided if hydrogen is used as the electrochemically active component instead of the metals noted above. This can be achieved, for example, by using a Raney alloy or Raney metal structures electrode as the negative. The term "Raney alloy" or "Raney metal structures" shall be understood to be a metal which is formed by an alloy of two components, the inactive component of which is dissolved out leaving the active component porous and more catalytically active. Possible active metal components of a Raney metal are iron, cobalt, nickel and palladium. Possible inactive alloy components for forming these Raney metals structures are aluminum, zinc and magnesium. Of particular advantage, however, are the alloys of nickel with aluminum or zinc. By dissolving part or all of the inactive component with alkali, large amounts of hydrogen become incorporated in the remaining Raney structure. It has been established by some investigators that freshly activated Raney nickel may contain so much hydrogen in atomic form that it corresponds to the compound $Ni_2H$. Others report an atomic ratio H:Ni of 1 has been found.

Most of this hydrogen can be exchanged reversibly at the potential of the hydrogen electrode in an alkaline solution. Combining such a Raney-metal hydrogen electrode with a conventional nickel hydroxide or with a silver oxide positive electrode there can be obtained a new alkaline accumulator which during discharge dissolves hydrogen at the cathode and reduces the oxide or hydroxide at the anode. This reaction can be expressed by the following equations:

At the negative electrode:

$$2(R\text{—}Ni\text{—}H) + 2OH^- \rightarrow 2(R\text{—}Ni) + 2H_2O + 2e^-$$

At the positive electrode:

$$(MeO) + H_2O + 2e^- \rightarrow Me + 2OH^-$$

The sum of these reactions is $$2H + O \rightarrow H_2O$$

Where:

(R—Ni—H) represents a Raney nickel structure saturated with hydrogen, and
MeO represents a metal oxide or oxyhydroxide as the case may be.

Because of the formation of water as a reaction product, the electrolyte becomes diluted during discharge. This water, however, is decomposed again during charge. During charge the Raney metal absorbs hydrogen, and the oxide or hydroxide on the positive electrode is reformed. In principle any oxide electrode operating reversibly in alkaline medium can serve as the positive electrode, as for example, nickel hydroxide and silver oxide electrodes.

The ability to reversibly absorb and release hydrogen is also common to pure palladium. Polarization, particularly during discharge is, however, more severe with palladium than with Raney-nickel. Other metals like platinum, iron and tantalum also are able to dissolve hydrogen, however, only in very minor amounts.

A suitable composition for the formation of a Raney metal structure in accordance with the present invention is a nickel-aluminum or a nickel-zinc alloy in which the nickel is present in 80–20% by weight. Within this range, however, it has been found preferable that the nickel be present in an amount of 40–60% by weight. The active Raney-nickel material may be processed in powder or paste form in known manner, may be pressed and sintered, incorporated in pockets of nickel plated steel, or held in place by nickel plated sieves or grids, which at the same time serve as current collector. In a well known manner, metal powders, such as nickel powder, or pulverized carbon can be mixed with the Raney-nickel to improve conductivity.

Figure 2:
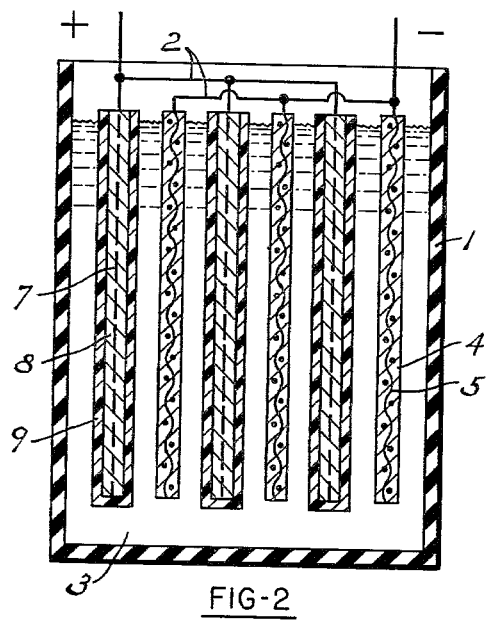

A better understanding of the present invention may be had from the following description when read with reference to the accompanying drawings of which:

FIG. 1 is a side elevation taken in section of an accumulator in accordance with the present invention; and
FIG. 2 is a modification of the accumulator shown in FIG. 1.

Referring now to the drawings, FIG. 1 shows schematically the construction of an accumulator according to the present invention using a nickel hydroxide electrode as the positive. This accumulator has a set of positive and a set of negative electrodes with three plates each with current leads 2 arranged in a container 1. The electrodes are immersed completely in the electrolyte 3 which is preferably a 20–30% KOH solution. The negative electrode consists of a sintered plate of Raney-nickel 4, into which there is incorporated a nickel screen 5 as a grid and current collector. The active mass of the nickel hydroxide electrode 6 is pressed on a perforated sheet of nickel 7.

When using a silver oxide electrode as the positive, it is necessary, as known by those skilled in the art of silver-zinc accumulators, to incorporate a diaphragm between the negative and positive electrodes. The material of the separator should be inert against alkali and silver oxide and should be impermeable for silver ions. These conditions are fulfilled, for example, by membranes consisting of p-phenylendiamin-formaldehyde.

Referring to FIG. 2 there is shown an example of an accumulator having silver oxide as the positive electrode material 8. The active mass is separated from the electrolyte and the negative electrodes by a pocket 9 of membrane material. Otherwise the arrangement corresponds to the one in FIG. 1, and similar reference characters have been used to designate components described in connection with that figure.

The electromotive force of the new alkaline accumulator is between 1.3 and 1.4 v. It can be stored just as other known alkaline accumulators, in charged, half discharged and completely discharged condition without deterioration. The allowable charge and discharge current densities are equal to or exceed the ones of the known alkaline nickel accumulators. The capacity of the Raney-nickel electrode is 200–400 amp, hr./kg. of Raney-nickel.

A preferred electrolyte is 20–30% KOH solution. Because of the formation of water, the concentration decreases during discharge. The concentration has its highest value at complete charge. This means that the state of charge can be determined conveniently by measuring the density of the electrolyte, just as in the case of lead-acid batteries.

The new alkaline accumulator employs a considerably less expensive material, and is more easily manufactured than the most important known alkaline systems, namely the nickel-cadmium battery. In addition, the new accumulator has a larger capacity per unit weight of active mass.

Having described the present invention, that which is claimed as new is:

1. An alkaline accumulator for the storage of electrical energy comprising, in combination, a negative electrode of Raney nickel which contains hydrogen, a positive electrode selected from the group consisting of nickel hydroxide and silver oxide, and an alkaline electrolyte.

2. Accumulator as specified in claim 1 wherein said negative electrode comprises Raney nickel in powder form pressed on a conductive grid.

3. Accumulator as specified in claim 1 wherein said Raney nickel is pasted on a conductive grid.

4. Accumulator as specified in claim 1 wherein said Raney nickel is mixed with a conductive material selected from the group consisting of powdered metal and carbon.

5. An accumulator in accordance with claim 1 in which said Raney nickel has been prepared from an alloy of from 40% to 60% by weight of nickel and an inactive metal selected from the group consisting of aluminum and zinc, said inactive metal having been leached from said alloy with an alkali solution.

6. An accumulator in accordance with claim 1 in which said Raney nickel has been prepared from an alloy of from 20% to 80% by weight of nickel and an inactive metal selected from the group consisting of aluminum and zinc, said inactive metal having been leached from said alloy with an alkali solution.

References Cited by the Examiner

UNITED STATES PATENTS

| 297,046 | 6/83 | Tomkins | 136—86 |
|---|---|---|---|
| 897,833 | 9/08 | Hubbell | 136—28 |
| 1,955,115 | 4/34 | Drumm. | |
| 2,384,463 | 9/45 | Gunn et al. | 136—86 |
| 2,928,891 | 3/60 | Justi et al. | 136—86 |
| 3,080,440 | 3/63 | Ruetschi | 136—3 |
| 3,132,972 | 5/64 | Ludwig | 136—86 |

OTHER REFERENCES

Schult et al.: Electro-Technology, vol. 68, July 1961, pp. 87–91.

Rodman: Journal of the American Electrochemical Society, vol. II, 1902, pp. 177–179.

JOHN H. MACK, *Primary Examiner.*

JOSEPH REBOLD, MURRAY TILLMAN, *Examiners.*